(12) United States Patent
Van Rijnsoever et al.

(10) Patent No.: US 6,633,644 B2
(45) Date of Patent: Oct. 14, 2003

(54) CONDITIONAL ACCESS SYSTEM FOR CONTROLLING THE ACCESS TO A DATA CONTENT

(75) Inventors: Bartholomeus Johannes Van Rijnsoever, Eindhoven (NL); Franciscus Lucas Antonius Johannes Kamperman, Eindhoven (NL); Mathieu Petrus Franciscus Maria Goudsmits, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 399 days.

(21) Appl. No.: 09/741,921

(22) Filed: Dec. 20, 2000

(65) Prior Publication Data

US 2001/0012366 A1 Aug. 9, 2001

(30) Foreign Application Priority Data

Dec. 22, 1999 (EP) .............................. 99204470

(51) Int. Cl.⁷ ...................... H04N 7/167; H04N 7/173
(52) U.S. Cl. ...................... 380/239; 380/211; 380/231; 380/241; 705/52; 705/58; 705/59
(58) Field of Search ................................. 380/205, 209, 380/210, 211, 221, 225, 227, 228, 230, 231, 233, 239, 240, 241, 242, 277, 278, 279, 280; 705/51, 52, 55, 56, 58, 59; 713/162, 163

(56) References Cited

U.S. PATENT DOCUMENTS 4,937,866 A * 6/1990 Crowther et al. ........... 380/241
5,224,161 A * 6/1993 Daniel et al. ............... 380/239
5,774,548 A * 6/1998 Bando et al. ............... 380/212
6,363,149 B1 * 3/2002 Candelore ................... 380/45
6,424,714 B1 * 7/2002 Wasilewski et al. ........ 380/200

OTHER PUBLICATIONS

Coutrot et al., "A Single Conditional Access System for Satellite–Cable and Terrestrial TV", IEEE Transactions on Consumer Electronics, vol. 35, No. 3, Aug. 1998, pp. 464–468.

* cited by examiner

Primary Examiner—Justin T. Darrow
(74) Attorney, Agent, or Firm—Daniel J. Piotrowski

(57) ABSTRACT

A conditional access system for controlling the access of receivers of end-users to data content transmitted from a data content source in an uplink system. The uplink system scrambles the content supplied from the content source, generates entitlement control messages containing a control word and an entitlement identification, and transmits the scrambled content and the entitlement control messages. A descrambler, an entitlement control message decoder and storage for recording entitlement identifications are associated to the receiver. The entitlement control message decoder supplies a control word to the descrambler for descrambling a part of the received scrambled content for which the receiver is entitled, if a match between the entitlement identification in the entitlement control message and the recorded entitlement identification exists. The content is subdivided into scenes having their own scene identification. The uplink system incorporates the scene identifications in the entitlement control messages.

16 Claims, 1 Drawing Sheet

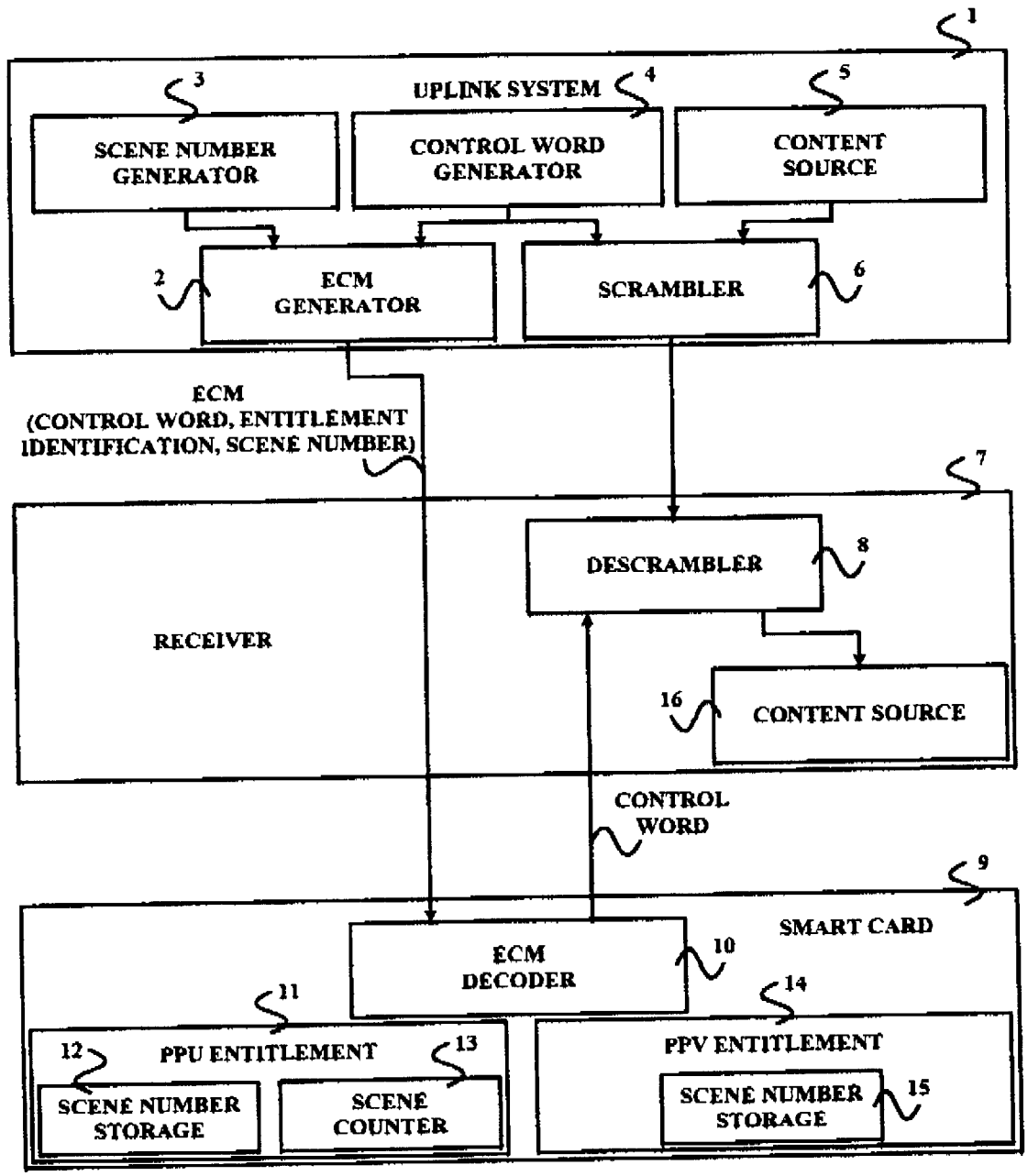

CONDITIONAL ACCESS SYSTEM FOR CONTROLLING THE ACCESS TO A DATA CONTENT

BACKGROUND OF THE INVENTION

The invention relates to a conditional access system for controlling the access of receivers of end-users to data content transmitted from a data content source in an uplink system, the uplink system employing a scrambler for scrambling the content supplied from the content source, an entitlement control message generator for generating entitlement control messages containing a control word and an entitlement identification and a transmitter for transmitting the scrambled content and the entitlement control messages, in which access system a descrambler, an entitlement control message decoder and means for recording entitlement identifications are associated to the receiver, and in which access system, if a match between the entitlement identification in the entitlement control message and the recorded entitlement identification exists, the entitlement control message decoder supplies a control word to the descrambler for descrambling a part of the received scrambled content for which the receiver is entitled.

Such a conditional access system is known from the article "A single conditional access system for satellite-cable and terrestrial TV" published in IEEE Transactions on Consumer Electronics, Vol. 35, No. 3, August 1989, pages 464–468.

For having access to an offered content item of information or data or television programs the end-user can buy an entitlement Such an entitlement gives the right to access a predefined program or service. The known conditional access systems control access to the content based on bought entitlements.

Such known conditional access systems have the disadvantage that after an entitlement has been bought it is not possible for the end-user to influence this right, other than by requesting the entitlement to be cancelled.

SUMMARY OF THE INVENTION

The invention has the object to provide a conditional access system of the abovementioned kind, in which more user influence is allowed.

This object is achieved by the invention in that the content is subdivided into scenes having their own scene identification and the uplink system is provided with a scene identification generator connected to the entitlement control message generator for incorporating the scene identifications in the entitlement control messages and that means are provided for registering the accessed scenes at the receiver.

By the division of the content in scenes the end-user has the possibility to interrupt watching of a (television) program or other service and to continue watching at a more appropriate moment when that same program is broadcasted again. The end-user could be charged for those parts of a service that he has actually accessed.

The invention will be explained further by reference to The enclosed figure showing The architecture of a preferred embodiment of a conditional access system according to X invention.

A service is a sequence of programs under the control of a broadcaster, which can be broadcasted as part of a schedule. The service is the central referenced entity.

According to the invention a further entity is introduced, which is called scene hereafer. Scenes divide content into separate parts.

The scenes may be defined on the basis of time (e.g., each scene lasts 5 minutes) on the basis of the amount of data (e.g, each scene represents 1 MByte of data), or in a content related way (e.g., each scene represents a website in a broadcast data carousel). Each scene is identified by an identification, hereafter called scene number.

BRIEF DESCRIPTION OF THE DRAWING

In the drawing, a conditional access system in accordance with one embodiment of the present invention is illustrated.

DETAILED DESCRIPTION OF THE PRESENTLY PREFERRED EMBODIMENT

By the introduction of scenes, two new types of conditional access could be implemented, i.e., divisible pay-per-view and pay-per-use respectively. Divisible pay-per-view allows The end-user to interrupt watching of a pay-per-view (television) program and to continue watching at a more appropriate moment when that same program is broadcasted again In case of pay-per-use, the end-user pays only for those pans of a (television) service he has actually accessed. Pay-per-view will be called PPV and pay-per-use PPU hereinafter.

The abovementioned types of conditional access could be implemented in a prior art conditional access system, which implementation is described hereafter.

Prior art conditional access systems use entitlement control messages for controlling the access to an offered content item and entitlement management messages for storing the bought entitlements at the end-user.

In conditional access systems several types of entitlements exist

A subscription entitlement gives access to a (range of) service(s), while a pay-per-view (PPV) entitlement gives access to a (range of) specific program(s) in a service. A PPV entitlement could be considered as a limited subscription entitlement.

As shown in the figure the uplink system 1 of the conditional access system comprises an ECM generator 2 to the inputs of which a scene number generator 3 and a control word generator 4 are connected. The uplink system 1 further comprises a content source S. of which the output is connected to a scrambler 6.

At the end-user location, a receiver 7 is provided, which comprises a descrambler 8. Furthermore, at The end-user location, a smart card 9 is provided, which comprises an ECM decoder 10. The smart card 9 has a PPU entitlement part 11 comprising a scene number storage 12 and a scene counter 13. The divisible PPV-entitlement part 14 of The smart card 9 comprises a scene number storage 15. A content sink 16 is connected to the descrambler 8 and receives descrambled information.

The scene numbers provided by the scene number generator 3 and the control words provided by the control word generator 4 are supplied to the ECM generator 2 in order to generate ECM's, each containing a control word, entitlement identification and scene number as illustrated in the figure.

The scene numbers are sequential, but they are reset at the so of each program. After a number of new control words, a new scene number is generated. As shown in the figure the ECM's are transmitted from the uplink system to the smart card by a transmitter not shown. The ECM's are decoded by the ECM decoder 10 in the smart card 9. The smart card 9 does so only if the end-user has previously bought the right (an entitlement) to access that content. For security reason the control word often changes value.

According To the invention, scenes are defined, which divide content into separate parts. Scenes may be defined on the basis of time (e.g., each scene lasts 5 minutes), on the basis of the amount of data (e g., each scene represents 1 MByte of data), or in a content related way (e.g., each scene represents a web-site in a broadcast data carrousel). Each scene is identified by a scene number and this number is incorporated in the ECM.

The smart card keeps track of the scenes for which it has decoded ECM's.

Divisible pay-per-view can be implemented by registering which scenes have been accessed and which have not. Preferably the scene numbers are sequential further, scenes numbers are assigned in the same way each time the same program is broadcast.

Pay-per-use can be implemented by counting the number of different scenes that were accessed. This number is later reported by the smart card of the end-user to the uplink system for the purpose of billing.

Pay-per-use can be used in a different way as well, via to reward the end-user for accessing (and hopefully watching) content. For this purpose, ECM's contain a flag that indicates that the scene counter decrements if the scene is accessed.

In case of divisible PPV and sequential scene numbers, the control word is provided to the descrambler 8 in the receiver 7 if there is a match between ECM and stored entitlement and if the scene number in The ECM is not lower than the scene number recorded in the entitlement Also, the scene number of the ECM is recorded in the divisible PPV entitlement part. If the scene number in the ECM is lower than the scene number in the entitlement part, then the end-user tries to access he same scene for the second time when a program is rebroadcast and no control word is provided.

In case of PPU, the smart card decodes the ECM and provides the control word to the descrambler 8 of the receiver 7 if the entitlement identifications match. Also, the scene number of the ECM is recorded in The PPU entitlement part 12. If the scene number is different from a previously recorded scene number, the end-user is accessing a new scene and the scene counter 13 is incremented by 1. In this way, the scene counter 13 registers the number of accessed scenes and serves as a basis for billing the end-user.

In case of pay-per-use (PPU), the number of scenes that has been accessed on the basis of a PPU entitlement is registered in the smart card for the purpose of billing. The number of accessed scenes cam be reported in any known way.

A scene may represent an amount of time or a number of bits. Scene numbers are incorporated in ECM's, so that a scene comprises one or more control word intervals.

A description of an example of an implementation follows.

PPU subscription ECM's include a scene number object <scene-nr>. The length of the scene number is 3 byes. The scene number breaks down into 2 parts. The 2 least significant bytes count scenes in a program This is relevant for divisible (I)PPV, as will be explained below. The most significant byte counts programs of a service. This is relevant for PPU. The least significant bytes are reset at the start of each program. The most significant byte is reset at regular intervals. (It is allowed that the most significant byte of the scene number loops.).

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A conditional access system for controlling an access to a data content divided into scenes, said conditional access system comprising:
   an uplink system operable to transmit a scrambled version of the data content and an entitlement control message associated with the scrambled version of the data content,
      wherein the entitlement control message includes at least one control word, at least one an entitlement identification, and a scene identification for each scene of the data content; and
   a receiver operable to receive the scrambled version of the data content and the entitlement control message, said receiver further operable to descramble the scrambled version of the data content based on the at least one control word and the at least one entitlement identification,
      wherein said receiver is further operable to facilitate one of a divisible pay-per-view entitlement and a pay-per-use entitlement based on the scene identifications.

2. The conditional access system of claim 1, wherein the scene identifications are identically assigned to repeatedly transmitted contents parts.

3. The conditional access system of claim 1, wherein said receiver descrambles the scrambled version of the data content based on the at least one control word, the at least one entitlement identification and the scene identifications.

4. The conditional access system of claim 1, wherein the scene identifications are sequential.

5. The conditional access system of claim 4, wherein said receiver descrambles the scrambled version of the data content based on the at least one control word, the at least one entitlement identification and the sequence of the scene identifications.

6. The conditional access system of claim 1, wherein a division of the data content into scenes is related to time.

7. The conditional access system of claim 1, wherein a division of the data content into scenes is related to amount of data.

8. The conditional access system of claim 1, wherein a division of the data content into scenes is related to subcontents.

9. A conditional access system for controlling an access to a data content divided into scenes, said conditional access system comprising:
   an uplink system including means for generating a scrambled version of the data content and an entitlement control message associated with the scrambled version of the data content,
      wherein the entitlement control message includes at least one control word, at least one an entitlement identification, and a scene identification for each scene of the data content; and
   a receiver operable to receive the scrambled version of the data content and the entitlement control message from said uplink system said receiver including
      means for descrambling the scrambled version of the data content based on the at least one control word and the at least one entitlement identification, and means for facilitating one of a divisible pay-per-view entitlement and a pay-per-use entitlement based on the scene identifications.

10. The conditional access system of claim 9, wherein the scene identifications are identically assigned to repeatedly transmitted contents parts.

11. The conditional access system of claim 9, wherein said means for descrambling the scrambled version of the data content based on the at least one control word and the at least one entitlement identification additionally bases the descrambling of the of the scrambled version of the data content based on the scene identifications.

12. The conditional access system of claim 9, wherein the scene identifications are sequential.

13. The conditional access system of claim 12, wherein said receiver descrambles the scrambled version of the data content based on the at least one control word, the at least one entitlement identification and the sequence of the scene identifications.

14. The conditional access system of claim 9, wherein a division of the data content into scenes is related to time.

15. The conditional access system of claim 9, wherein a division of the data content into scenes is related to amount of data.

16. The conditional access system of claim 9, wherein a division of the data content into scenes is related to subcontents.

\* \* \* \* \*